US010857984B2

(12) United States Patent
Righetti (10) Patent No.: US 10,857,984 B2
(45) Date of Patent: Dec. 8, 2020

(54) SUPPORT APPARATUS

(71) Applicant: SIMOL S.P.A., Luzzara (RE) (IT)

(72) Inventor: Valter Righetti, San Benedetto Po (IT)

(73) Assignee: SIMOL S.P.A., Luzzara (IT)

( * ) Notice: Subject to any disclaimer, the term of this patent is extended or adjusted under 35 U.S.C. 154(b) by 0 days.

(21) Appl. No.: 16/391,669

(22) Filed: Apr. 23, 2019

(65) Prior Publication Data

US 2019/0329741 A1  Oct. 31, 2019

(30) Foreign Application Priority Data

Apr. 27, 2018  (IT) .......................... 102018000004959

(51) Int. Cl.
*B60S 9/10* (2006.01)
*B62D 63/08* (2006.01)
(Continued)

(52) U.S. Cl.
CPC ............... *B60S 9/10* (2013.01); *B62D 63/08* (2013.01); *F15B 11/10* (2013.01); *F15B 11/16* (2013.01);
(Continued)

(58) Field of Classification Search
CPC ... B60S 9/10; B60S 9/12; B62D 63/08; F16H 19/04; F15B 11/10; F15B 11/16;
(Continued)

(56) References Cited

U.S. PATENT DOCUMENTS 2,546,203 A * 3/1951 Woodrow ................. B60S 9/10
254/423
2,837,312 A * 6/1958 Troche ..................... B60S 9/12
254/423
(Continued)

FOREIGN PATENT DOCUMENTS

CN        207000278 U    2/2018
DE    202016107009 U1    8/2017

*Primary Examiner* — Muhammad Ijaz
(74) *Attorney, Agent, or Firm* — Browdy and Neimark, P.L.L.C.

(57) ABSTRACT

A support apparatus is equipped with a support foot of hydraulic type that comprises: a cylinder equipped with a cavity axially shaped that has a longitudinal axis, a piston slidably received in a sealed manner in the cavity so as to divide said cavity into a first chamber and a second chamber, a stem provided with a first end fixedly connected to the piston and a second end that protrudes from the cylinder, a base fixed to the second end of the stem, and an actuation group of the support foot configured to selectively send a pressurised work fluid to the first chamber or to the second chamber so as to change the relative position of the base with respect to the cylinder. Where said support apparatus comprises: a position sensor configured to monitor the value of a parameter indicative of the position of the base with respect to a reference element fixedly connected to the cylinder, and an electronic control unit, electrically connected to said position sensor, which is configured to transmit the value of the indicative parameter monitored by the position sensor to a remote device and to control the (Continued)

activation of the actuation group of the support foot as a function of an activation signal and the value of the indicative parameter.

11 Claims, 11 Drawing Sheets

(51) Int. Cl.
*F15B 11/10* (2006.01)
*F15B 11/16* (2006.01)
*F15B 15/06* (2006.01)
*F15B 15/28* (2006.01)
*F16H 19/04* (2006.01)

(52) U.S. Cl.
CPC ........ *F15B 15/065* (2013.01); *F15B 15/2815* (2013.01); *F16H 19/04* (2013.01); *F15B 2211/7053* (2013.01); *F15B 2211/71* (2013.01); *F15B 2211/765* (2013.01)

(58) Field of Classification Search
CPC ................ F15B 15/065; F15B 15/2815; F15B 2211/7053; F15B 2211/71; F15B 2211/765
USPC ...... 280/766.1; 248/550, 570, 676, 677, 404
See application file for complete search history.

(56) References Cited

U.S. PATENT DOCUMENTS

| | | | | |
|---|---|---|---|---|
| 3,448,998 | A * | 6/1969 | Abolins | B60S 9/08 280/766.1 |
| 5,013,011 | A | 5/1991 | Halloway | |
| 6,105,940 | A * | 8/2000 | Charette | B66F 3/36 254/423 |
| 6,142,501 | A * | 11/2000 | Fogo | B60S 9/02 254/419 |
| 6,711,985 | B1 * | 3/2004 | Doyle | A47B 51/00 248/188.5 |
| 8,944,466 | B2 * | 2/2015 | St-Yves | E06C 5/04 280/763.1 |
| 2008/0093155 | A1 * | 4/2008 | Ishikawa | B62D 15/025 180/426 |
| 2010/0096819 | A1 | 4/2010 | Flynn et al. | |
| 2012/0098243 | A1 * | 4/2012 | Diaz | B60S 9/215 280/766.1 |
| 2015/0291402 | A1 * | 10/2015 | Boos | B66C 23/80 212/302 |
| 2016/0223062 | A1 * | 8/2016 | Pate | B65G 11/12 |
| 2017/0234119 | A1 * | 8/2017 | Allen | E21B 7/024 700/275 |
| 2020/0000663 | A1 * | 1/2020 | Fiedler | A61G 13/104 |

* cited by examiner

SUPPORT APPARATUS

TECHNICAL FIELD

The present invention refers to a support apparatus for structures and/or machines, in particular a support apparatus for trailers equipped with a support foot.

PRIOR ART

Support apparatuses comprising extensible support feet, which are generally used to lift and/or level structures or machines in order to allow them to be rested stably on the ground, are known.

For example, support feet are used to support the drawbar of a trailer when said trailer is not connected to the drawing vehicle and in the connection or disconnection steps of the trailer from the drawing vehicle.

Given the substantial weights involved, hydraulic support feet are used, which are actuated, through an actuation system connected to the drawing vehicle or to the trailer, between a retracted position, in which the length of the foot is the minimum and does not hinder the manoeuvres of the drawing vehicle, and an extracted position, in which the length of the foot is the maximum and lifts the drawbar of the truck from the ground.

Known support apparatuses require an operator who oversees the actuation operations of the foot to verify the presence of all of the correct operating and safety conditions.

A further drawback of devices of the prior art is the fact that the support foot can be accidentally positioned on an unstable surface, a circumstance that can also lead to the truck tipping over when it is disconnected from the drawing vehicle.

A purpose of the present invention is to overcome the drawbacks of known support apparatuses with a simple, rational and low-cost solution.

SUMMARY OF THE INVENTION

The invention provides a support apparatus equipped with a support foot of hydraulic type that comprises:

a cylinder equipped with a cavity axially shaped that has a longitudinal axis, a piston slidably received in a sealed manner in the cavity so as to divide said cavity into a first chamber and a second chamber, a stem provided with a first end fixedly connected to the piston and a second end that protrudes from the cylinder, a base fixed to the second end of the stem, and an actuation group of the support foot configured to selectively send a pressurised work fluid to the first chamber or to the second chamber so as to change the relative position of the base with respect to the cylinder, said support apparatus being characterised in that it comprises:

a position sensor configured to monitor the value of a parameter indicative of the position of the base with respect to a reference element fixedly connected to the cylinder, and an electronic control unit, electrically connected to said position sensor, which is configured to transmit the value of the indicative parameter monitored by the position sensor to a remote device and to control the activation of the actuation group of the support foot as a function of an activation signal and the value of the indicative parameter.

Thanks to such a solution the support apparatus according to the invention, with respect to devices of the prior art, is safer, thanks to the continuous monitoring of the position of the base.

Such an advantage is improved upon by an aspect of the invention according to which the electronic control unit can be configured to interrupt the activation of the actuation group when the value of the indicative parameter equals a predetermined value.

Another aspect of the invention foresees that the electronic control unit can be adapted for being connected to the remote device, for example, if the support foot is associated with the drawbar of a trailer, the electronic control unit of the support foot can be connected to a remote electronic control unit, arranged on-board a drawing vehicle of the trailer.

In this way it is possible to interface the support apparatus with the drawing vehicle of the trailer and control it, as well as to monitor the position of the base of the support foot from the drawing vehicle, without needing to get out of it.

Preferably, the electronic control unit comprises an interface that uses a can-bus logic for the connection to the remote electronic control unit.

According to another aspect of the invention, the support foot can comprise a connection flange adapted for allowing the attachment thereof to an object to be supported, for example for attaching to the trailer to be supported, and in which the cylinder is rotatably associated with said flange according to a rotation axis.

In this way, it is possible to orient the support foot between a first operative position in which the axis of the cylinder of the support foot is substantially parallel to the ground, and a second operative position in which the axis of the cylinder of the support foot is substantially perpendicular to the ground.

According to a further aspect of the invention, the support apparatus comprises an orientation system of the support foot, which is configured to rotate the cylinder with respect to the flange about the rotation axis.

Thanks to such a solution, the operator does not have to manually orient the support foot.

According to yet another aspect of the invention, the orientation system can comprise:

a cylinder, which at one end is fixed to the cylinder of the support foot and at another end is hinged to the flange with respect to the rotation axis, a piston slidably received in a sealed manner in a cavity axially shaped of the cylinder of the orientation system so as to divide said axial cavity into a first volume and a second volume, a stem equipped with an end fixedly connected to said piston and an end that protrudes from the cavity of the cylinder, a toothed wheel fixed without degrees of freedom to the flange and coaxial to the rotation axis, a rack fixed to the stem and that engages with the toothed wheel, and a selector block configured to selectively send a pressurised work fluid to the first volume or to the second volume so as to make the rack rotate with respect to the toothed wheel.

In this way, an orientation system of a support foot is provided that is particularly simple and strong.

Yet another aspect of the invention foresees that the support apparatus can comprise a tilt sensor configured to monitor the value of a parameter indicative of the angle of inclination of the support foot with respect to a vertical axis and a horizontal axis, and in which the electronic control unit is configured to transmit the value of the parameter indicative of the angle of inclination to the remote device.

In this way, the safety of the support apparatus is increased with respect to devices of the prior art, since it is possible to know, based on the value of the inclination, whether the support foot is correctly positioned. Moreover, such a characteristic makes it possible to carry out the checking of the correct positioning of the foot without having to visually follow the operations.

Preferably, the electronic control unit can be configured to control the activation of the selector block of the orientation system as a function of an activation signal and of the value of the parameter indicative of the angle of inclination.

Furthermore, the electronic control unit can be configured to send an alarm signal to the remote device when the value of the parameter indicative of the angle of inclination is different from a preset value.

According to a further aspect of the invention, the support apparatus can comprise a system for measuring the weight bearing down on the support foot configured to monitor the value of a parameter indicative of the weight bearing down on the support foot and electrically connected to the electronic control unit, which is configured to transmit the parameter indicative of the weight bearing down on the support foot to the remote device.

Thanks to such a solution it is possible to monitor, also remotely, the weight bearing down on the support foot with a great advantage for safety, since through such a characteristic it is possible to precisely evaluate possible danger conditions before they become apparent.

Preferably, the system for measuring the weight can comprise a first pressure transducer housed in the first chamber and a second pressure transducer housed in the second chamber.

The invention also provides a vehicle comprising a trailer equipped with a plurality of wheels for resting on the ground and a support apparatus according to claim 1.

BRIEF DESCRIPTION OF THE DRAWINGS

Further characteristics and advantages of the invention will become clear from reading the following description provided as an example and not for limiting purposes, with the help of the figures illustrated in the attached tables.

DETAILED DESCRIPTION

Hereinafter some embodiments of the support apparatus according to the invention applied to a vehicle are described. However, the support apparatus according to the invention can also have application in different kinds of apparatuses, like as a non-limiting example platforms or frames of industrial plants.

With particular reference to such figures, reference numeral 1 globally indicates a vehicle comprising a drawing vehicle 4 and a trailer 2. The trailer is equipped with a drawbar 3 provided with a support apparatus 10, the latter comprising a support foot 15,15' at the ground.

In particular, the support apparatus 10 is configured to support and/or lift the drawbar 3 of the trailer 2 through the support foot 15,15', which, in the present embodiment of the invention, is of the hydraulic, or oil-hydraulic type, and is fixed to the drawbar 3 through an attachment flange 20,20'.

Hereinafter two preferred embodiments of the invention are described.

Figure 9:
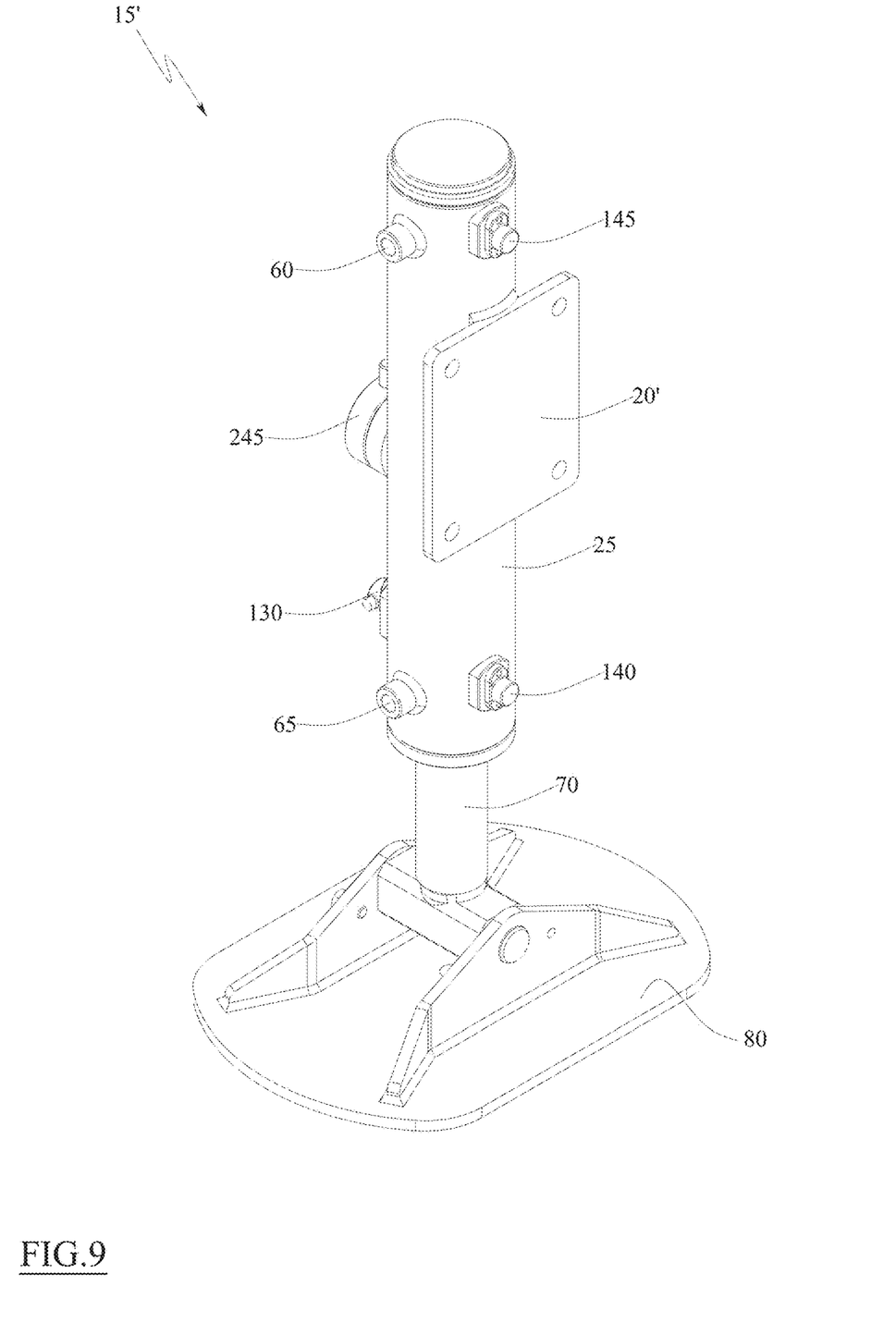
FIG. 9 is an axonometric view of a second embodiment of the support foot according to the invention.

In a first embodiment illustrated in FIG. 9, the flange 20' is configured to prevent any rotation of the support foot 15 with respect to the trailer 2.

In particular, the support foot 15' comprises a cylinder 25 connected to the trailer 2 through the flange 20', and, in said first embodiment, the flange 20' is fixedly connected, for example welded or bolted, to the cylinder 25.

Said cylinder 25 comprises a first upper end 30, for example proximal to the flange 20', and a second lower end 35, for example distal from the flange 20'.

The cylinder 25 is equipped with a cavity 40 axially shaped that has a longitudinal axis Z.

Preferably said cavity 40 extends substantially from the first end 30 to the second end 35.

The cavity 40 is closed close to the first end 30 and has an opening, for example coaxial to the longitudinal axis Z, close to the second end 35.

Said cavity 40 is substantially cylindrical, i.e. it has a cylindrical inner surface coaxial to the longitudinal axis Z.

The support foot 15' comprises a piston 45 slidably received in the cavity 40 of the cylinder 25 and that divides said cavity 40 of the cylinder 25 into a first chamber 50 and a second chamber 55.

The first chamber 50 and the second chamber 55 communicate with the outside through a first access mouth 60 and a second access mouth 65, respectively, which are formed in the cylinder 25.

The piston 45 is configured to slide in a sealed manner inside the cavity 40 along the longitudinal axis Z, i.e. it is configured to slide in contact with the inner surface of the cavity 40 along the longitudinal axis Z so as to make a hermetic seal with said inner surface.

The support foot 15' comprises a stem 70, which is fixedly connected to the piston 45, for example without degrees of freedom with respect to said piston 45, and slides with it along the longitudinal axis Z, to which it is coaxial.

In particular, the stem 70 has an end fixedly connected to the piston 45 and an opposite end that projects from the cylinder 25 through the opening of said cavity 40.

In said opening there is a bushing 75 adapted for guiding the stem 70 and for hermetically closing, together with the stem, the opening.

The support foot 15' comprises a base 80 for resting on the ground associated with the end of the stem 70 that protrudes from the cylinder 25.

In the embodiments illustrated in the figures the base 80 is hinged to the end of the stem 70 that protrudes from the cylinder 25, so as to be able to freely rotate with respect to the axis z of the cylinder itself.

The support apparatus 10 comprises an actuation group 85 of the support foot 15'.

Figure 11:
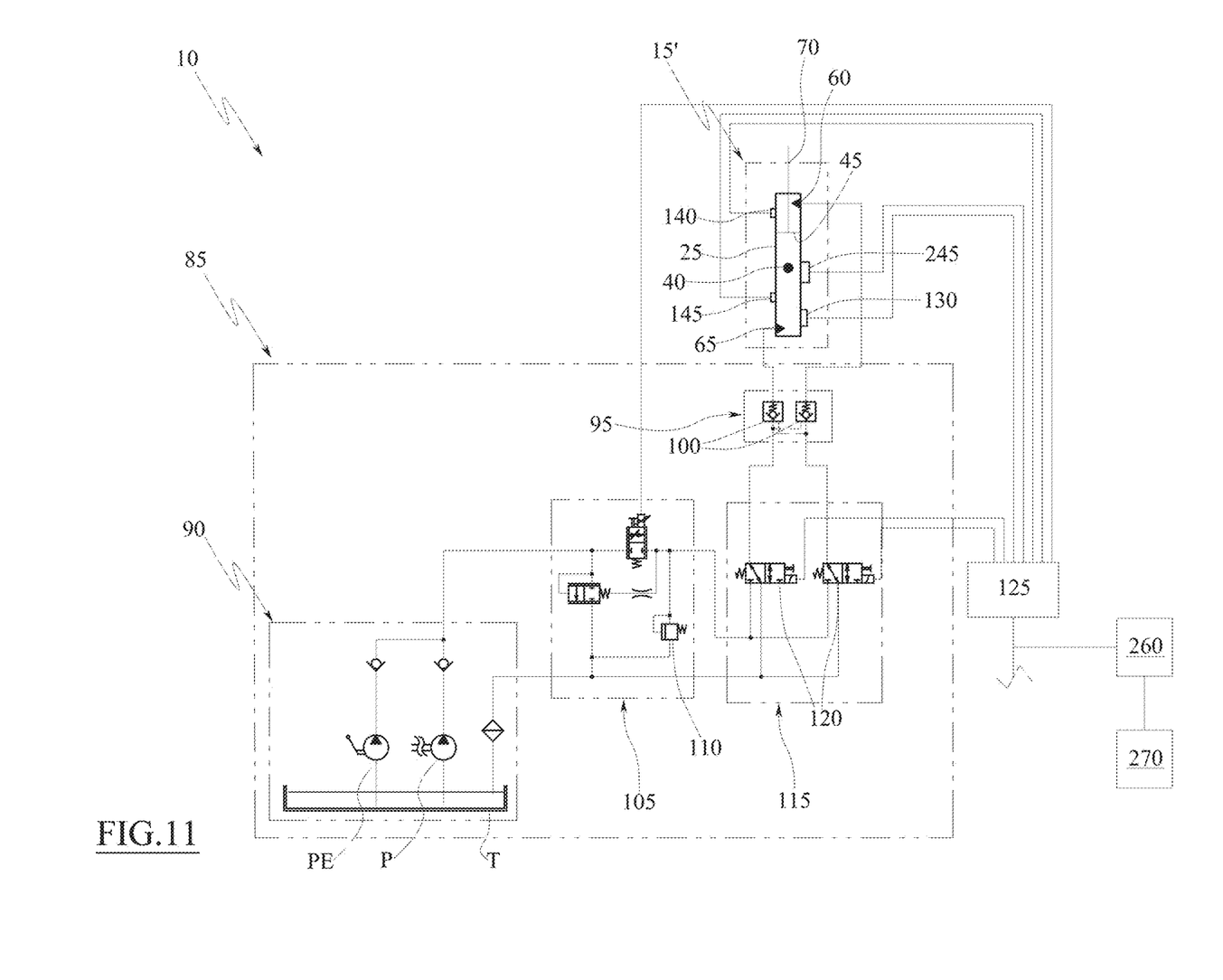
FIG. 11 is a circuit diagram of the support apparatus according to the embodiment of FIG. 9.

The actuation group 85 is of the hydraulic type, i.e. it comprises a feeding block 90 equipped with a tank T and with a pump P adapted for putting a work fluid contained in the tank T under pressure to send it to the support foot 15'.

For example, the actuation group 85 also comprises an emergency pump PE, arranged parallel to the main pump P.

In the illustrated embodiment, the pump P is installed on the drawing vehicle of the vehicle 1. However, this does not rule out the possibility that the pump P can be installed on the trailer of the vehicle 1.

The actuation group 85 is configured to selectively send a pressurised work fluid to the first chamber 50 or to the second chamber 55 (respectively through the first mouth 60 and the second mouth 65) so as to move the stem 70 with respect to the cylinder 25 between at least one retracted position, in which the extension of the support foot 15' along the longitudinal axis Z is the minimum, and an extended position, in which the extension of the support foot 15' along the longitudinal axis Z is the maximum.

In other words, in the retracted position the distance between the base 80 and a reference element fixedly connected to the cylinder 25 is the minimum and in the extended position, in which the base rests on the ground, the distance between the base 80 and said reference element fixedly connected to the cylinder 25 is the maximum.

For example, said reference element is the first end 30 of the cylinder 25.

The actuation group 85 is also configured to position the stem 70 in any intermediate position comprised between the retracted position and the extended position.

For example, the actuation group 85 comprises a stabilizing block 95 configured to prevent the outflow of work fluid from the support foot 15', i.e. from the first chamber 50 and from the second chamber 55, when it is not actuated, so as to block the relative sliding of the stem 70 with respect to the cylinder 25 in the position previously reached.

Preferably, said stabilizing block 95 comprises a pair of controlled unidirectional valves 100, each respectively connected to the first chamber 50 or to the second chamber 55.

Each controlled unidirectional valve 100 is controlled through a connection to a feeding line adapted for feeding the other controlled unidirectional valve 100.

The actuation group 85 also comprises a flow rate regulating block 105 arranged immediately downstream of the pump P and equipped with a limiting safety valve 110.

Moreover, the actuation group 85 comprises a selecting block 115 arranged between the stabilizing block 95 and the flow rate regulating block 105.

The selecting block 115 is equipped with a pair of selecting valves 120, each connected to only one among the first chamber 50 and the second chamber 55 and configured to selectively place the respective chamber 50,55 in communication with the pump P, i.e. with the flow rate regulating block 105, or with the tank T.

The support apparatus 10 comprises a position sensor 130 configured to monitor the value of a parameter indicative of the position of the base 80 with respect to a reference element fixedly connected to the cylinder 25, i.e. indicative of the distance of the base 80 from the first end 30 of the cylinder 25.

For example, the position sensor 130 is equipped with a linear encoder associated with the cylinder 25 and with the stem 70.

The support apparatus 10 also comprises a system for measuring the weight 135 configured to monitor the value of a parameter indicative of the weight bearing down on the support foot 15,15'.

In the illustrated embodiments, the system for measuring the weight 135 comprises a first pressure transducer 140 configured to detect a value indicative of the pressure in the first chamber 50 and a second pressure transducer 145 configured to detect a value indicative of the pressure in the second chamber 55.

The support apparatus 10 also comprises a tilt sensor 245, which is configured to monitor the value of a parameter indicative of the angle of inclination of the axis Z with respect to an axis perpendicular to a plane of the ground, for example with respect to a vertical axis.

Preferably, the tilt sensor 245 is configured to also monitor the value of a parameter indicative of the angle of inclination of the axis Z with respect to an axis parallel to the plane of the ground, for example with respect to a horizontal axis.

The tilt sensor 245, for example, comprises a inclinometer, preferably a digital inclinometer with two perpendicular axes.

The inclinometer is a two-channel inclinometer, however this does not rule out the possibility that in a different embodiment the tilt sensor 245 can comprise two single-channel inclinometers.

In a second embodiment illustrated in FIGS. 1-8, the support apparatus 10 comprises all of the elements of the first embodiment, with the exception of the flange 20' which is replaced by the flange 20 and the support foot, and adds some more.

Figure 1:
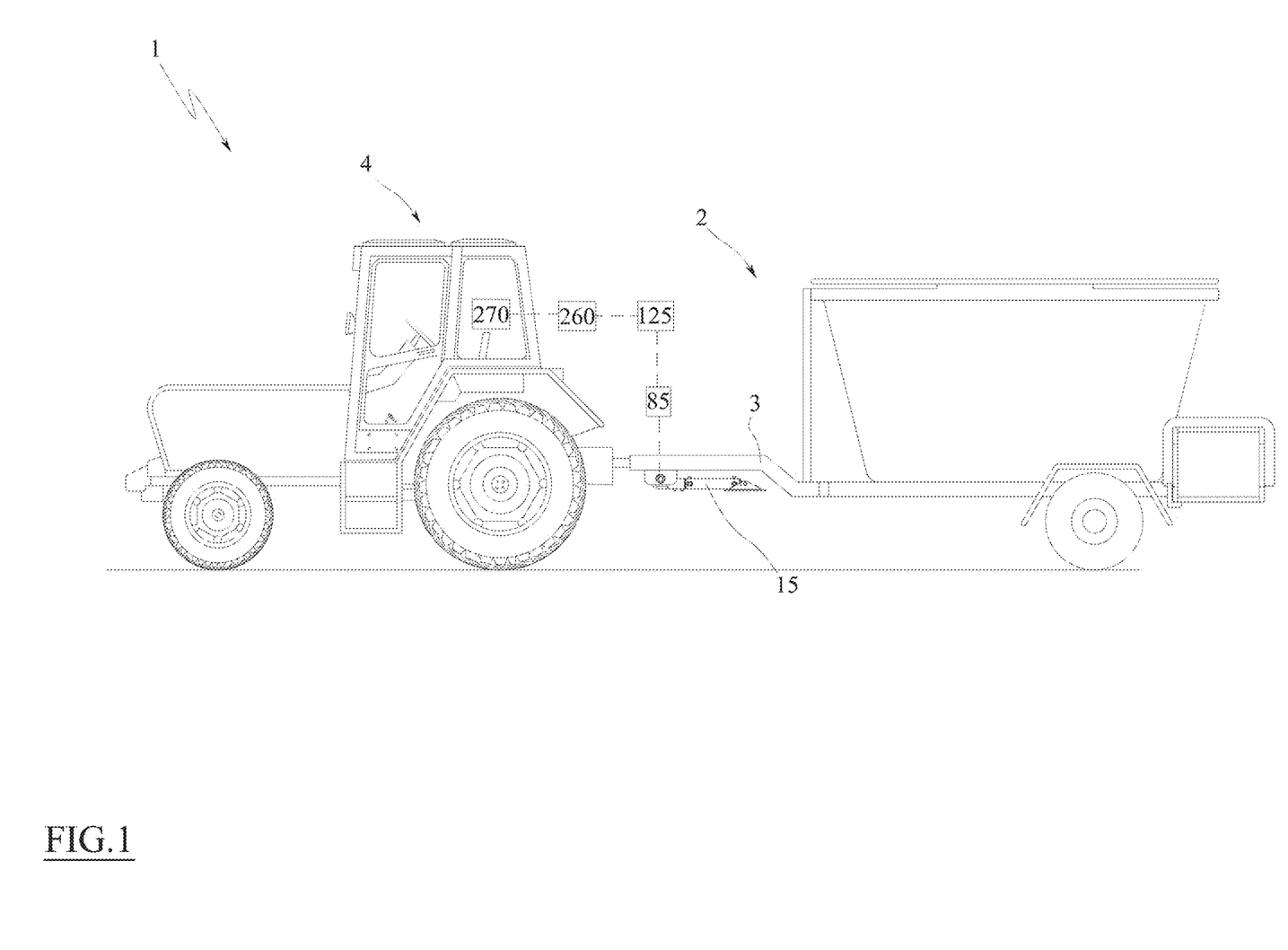
FIG. 1 is a side view of a lorry with trailer equipped with the lifting apparatus according to the invention in a first operative position.
Figure 2:
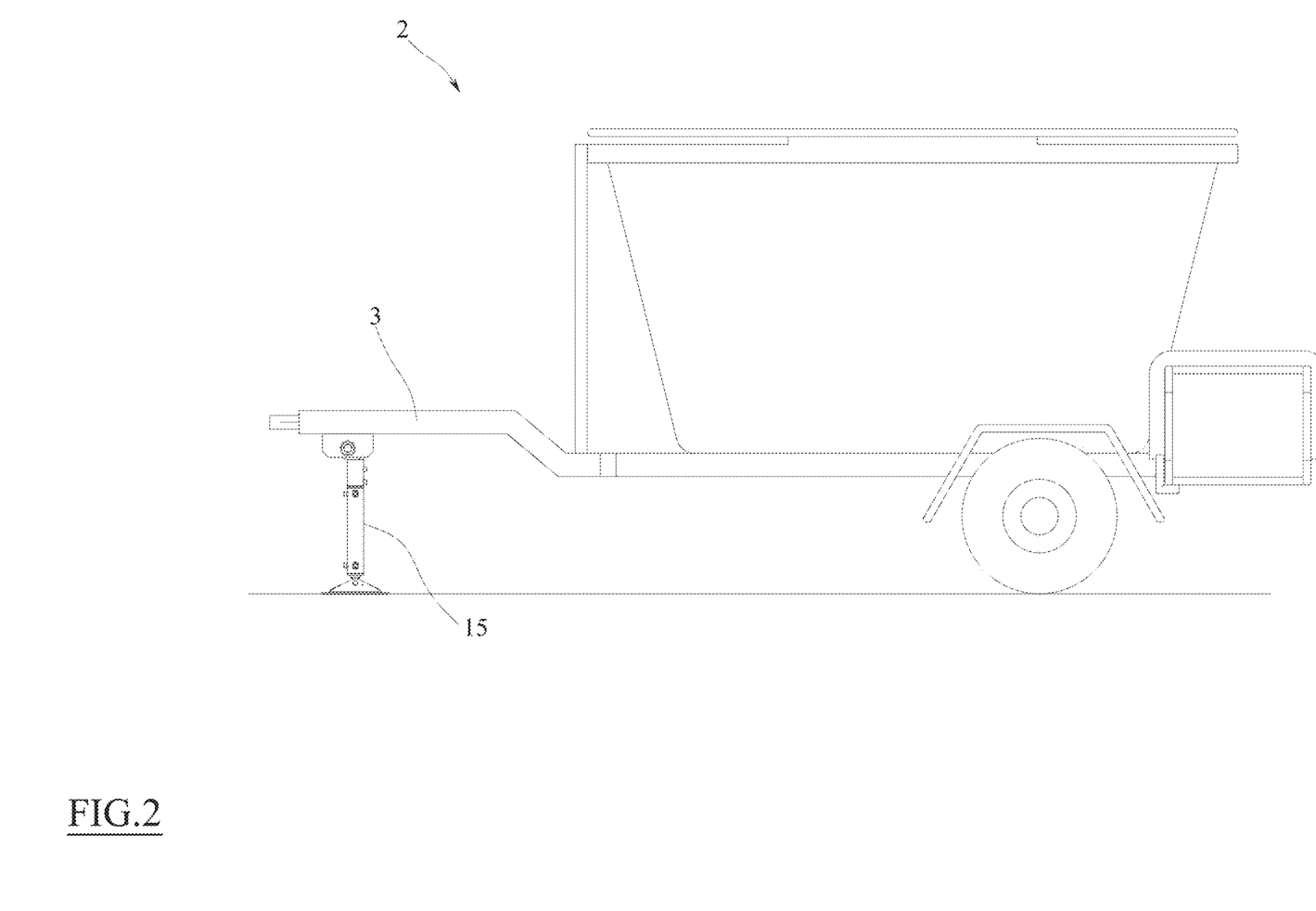
FIG. 2 is a side view of the trailer of FIG. 1 in which the lifting apparatus is in a second operative position.
Figure 3:
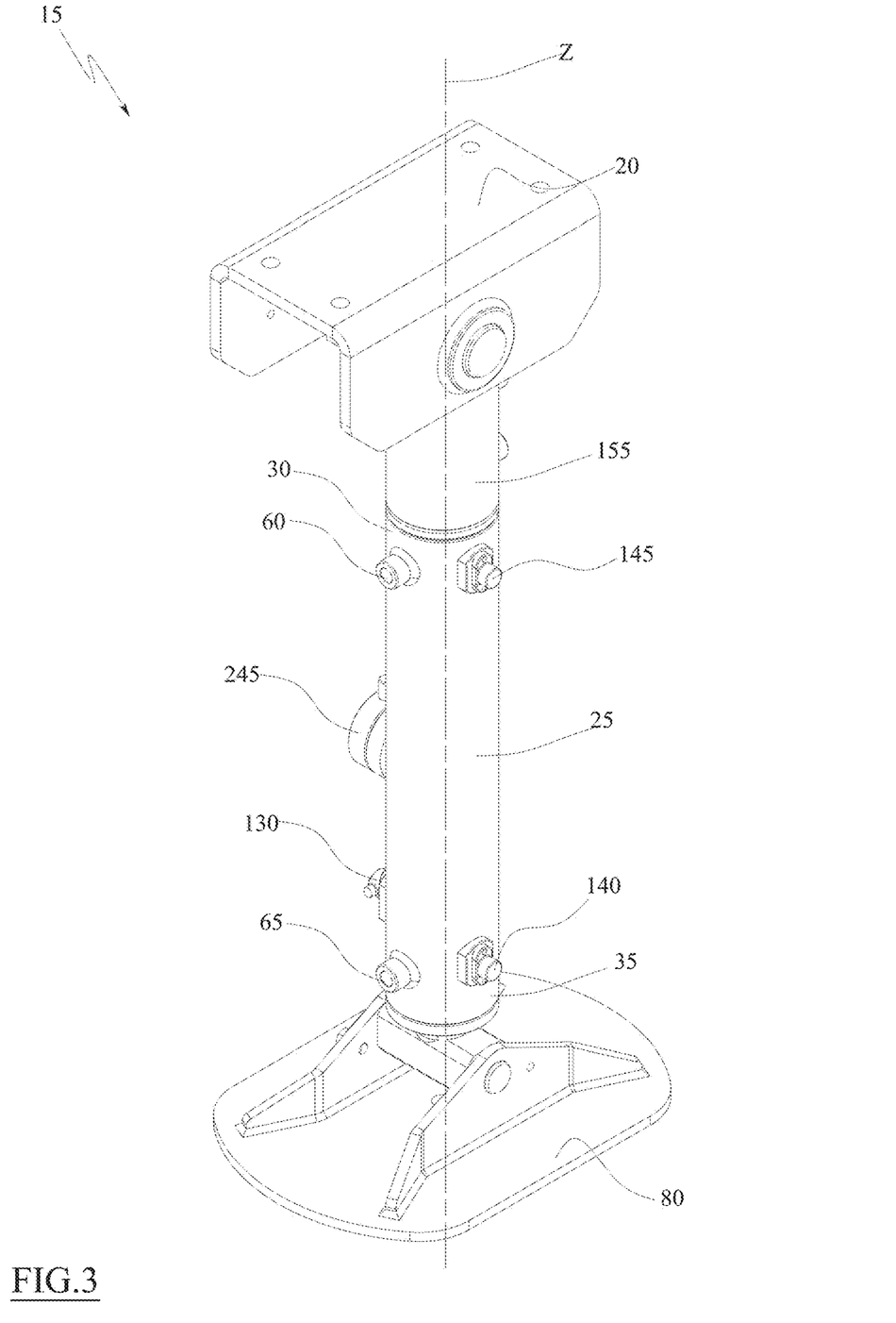
FIG. 3 is an axonometric view of a support foot of the lifting apparatus according to the invention.
Figure 4:
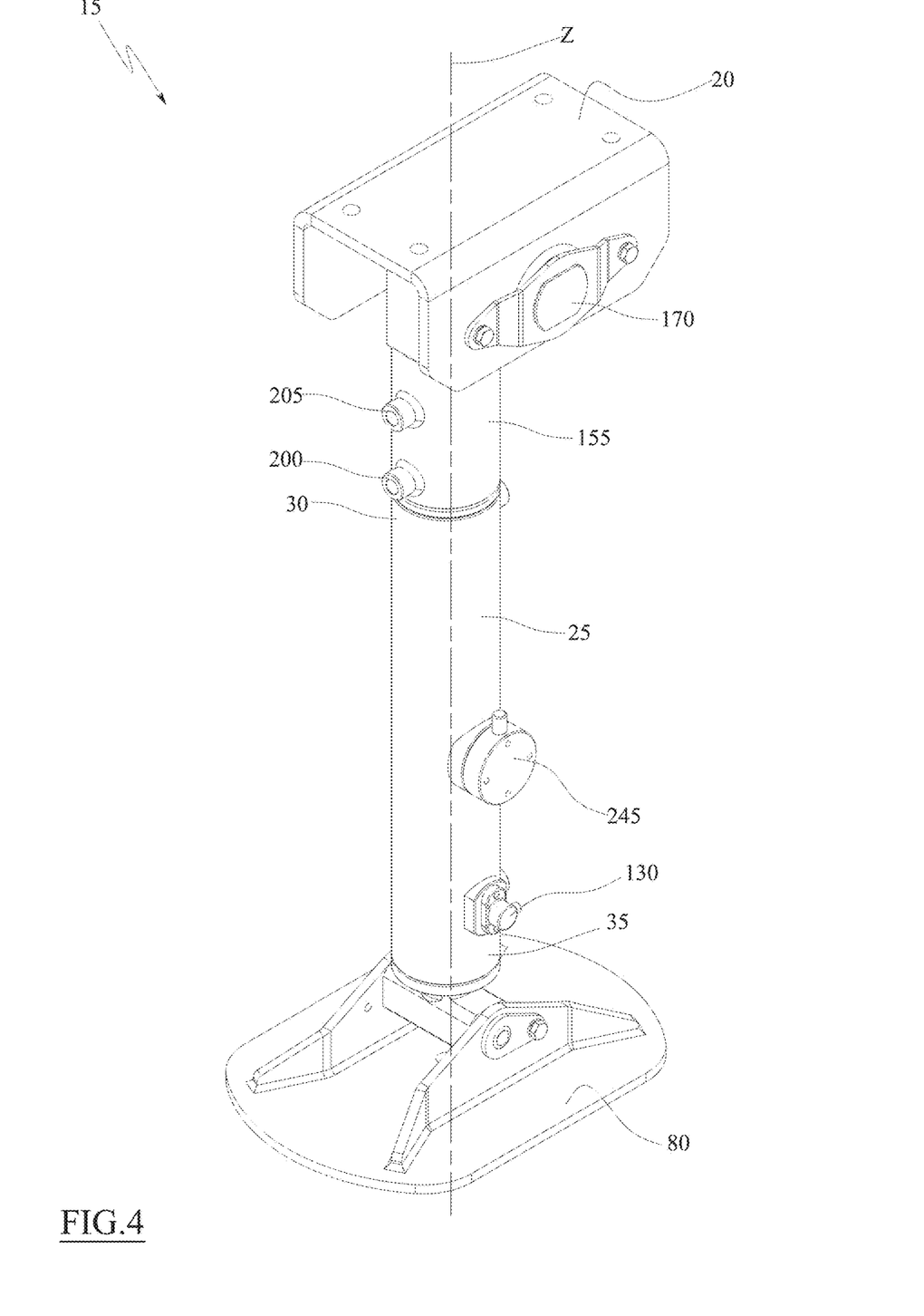
FIG. 4 is an axonometric view of the support foot of FIG. 3 rotated by 180°.
Figure 5:
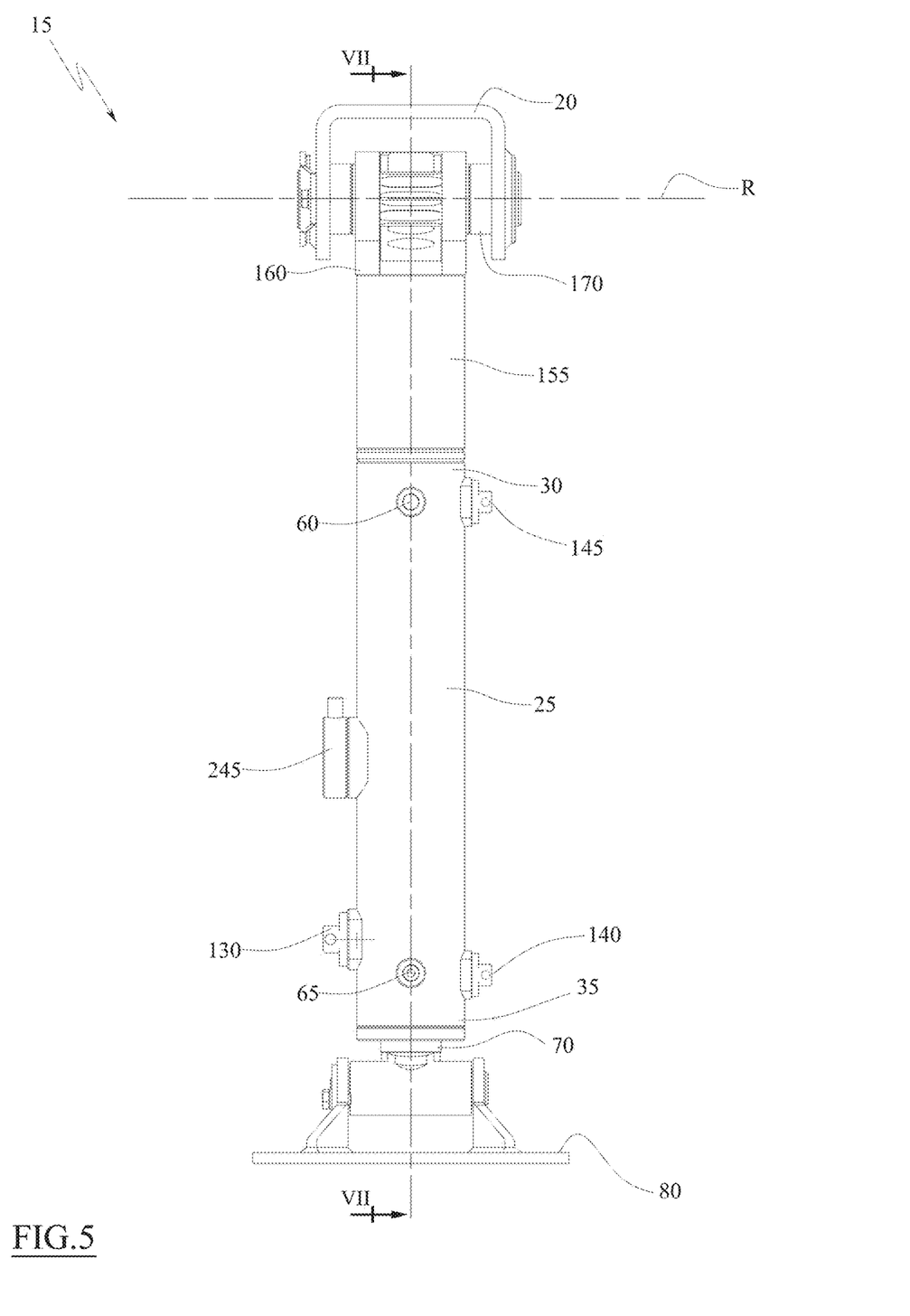
FIG. 5 is a side view of the support foot in FIG. 3 in a retracted position.
Figure 6:
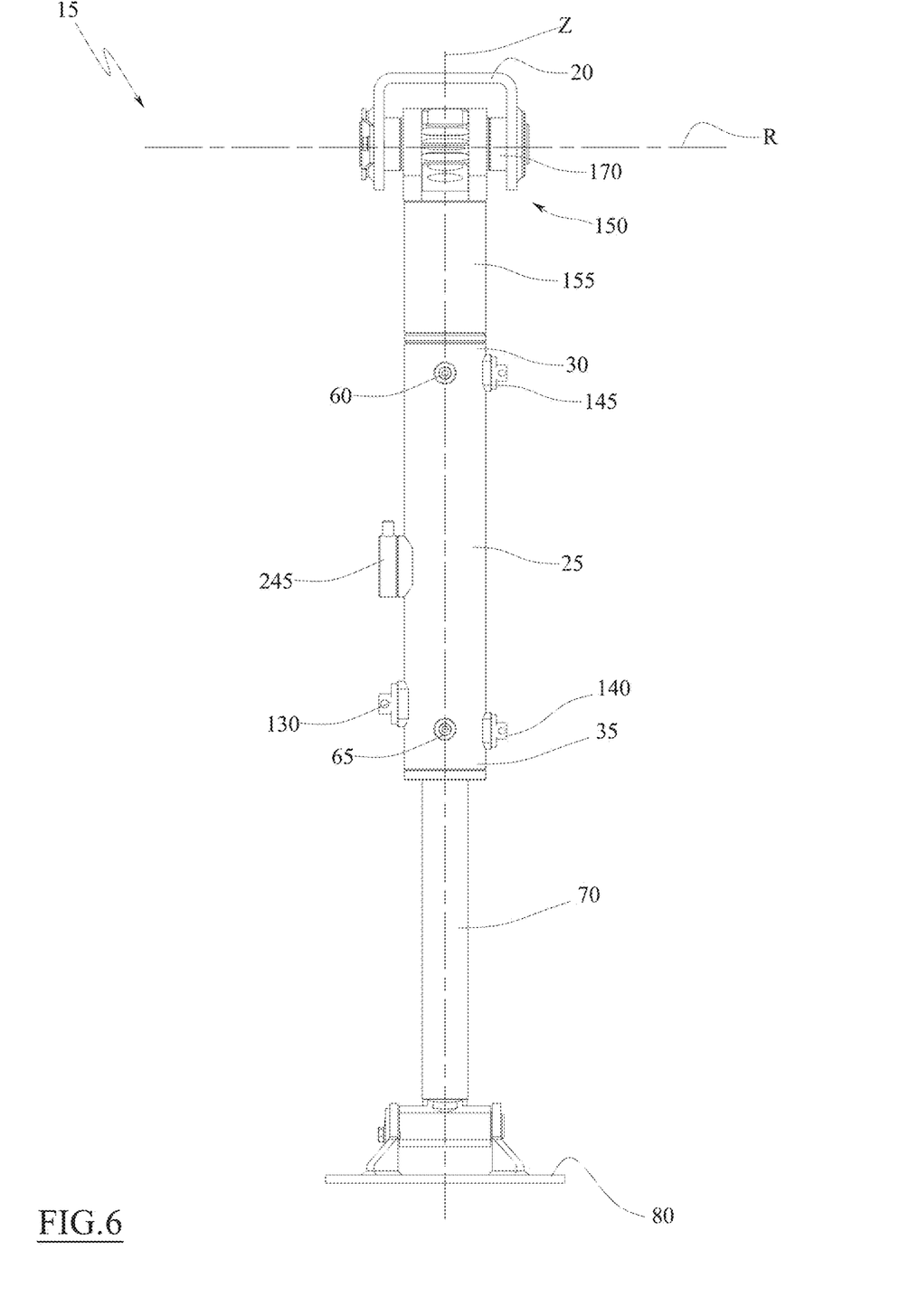
FIG. 6 is a side view of the support foot in FIG. 5, in which the support foot is in an extended position.

In the second embodiment, the support apparatus 10 has a support foot 15, the cylinder 25 of which is rotatably associated with the flange 20 with respect to a rotation axis R, for example perpendicular to the longitudinal axis Z, and is mobile between a first operative position, in which the support foot 15, i.e. the longitudinal axis Z, forms an acute angle greater than 30° with a plane of the ground, and a second operative position, in which the support foot 15, i.e. the longitudinal axis Z, is substantially perpendicular to the ground.

In particular in the second embodiment, the support apparatus 10 comprises an orientation system 150, for example hydraulic, configured to rotate the support foot 15, i.e. to rotate the cylinder 25, with respect to the rotation axis R.

For example, the orientation system 150 is configured to orient the support foot 15 between the first operative position, and the second operative position.

Preferably, in the first operative position, the support foot 15 is substantially parallel to the ground.

Figure 7:
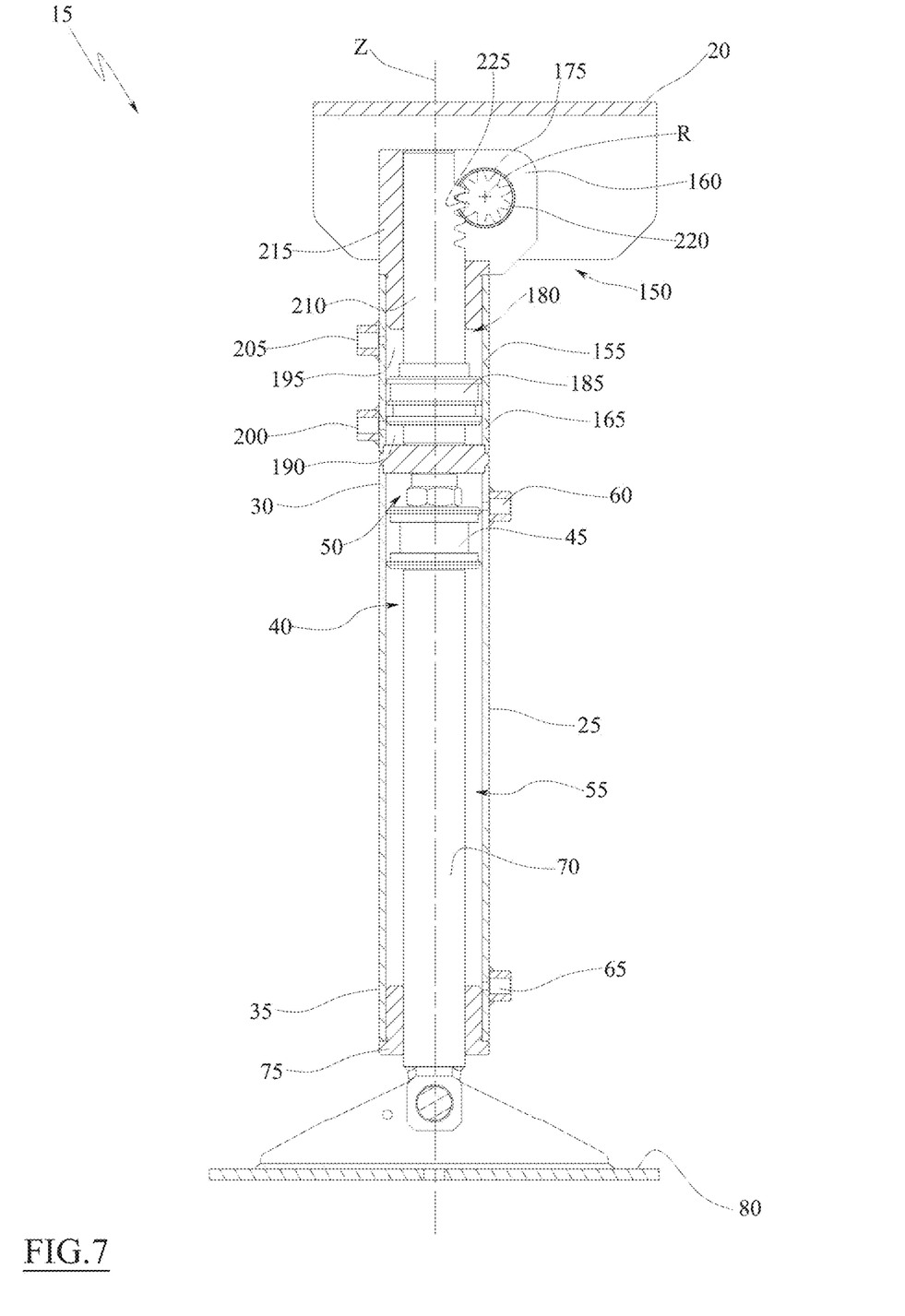
FIG. 7 is a section view of FIG. 5 according to the section plane VII-VII.
Figure 8:
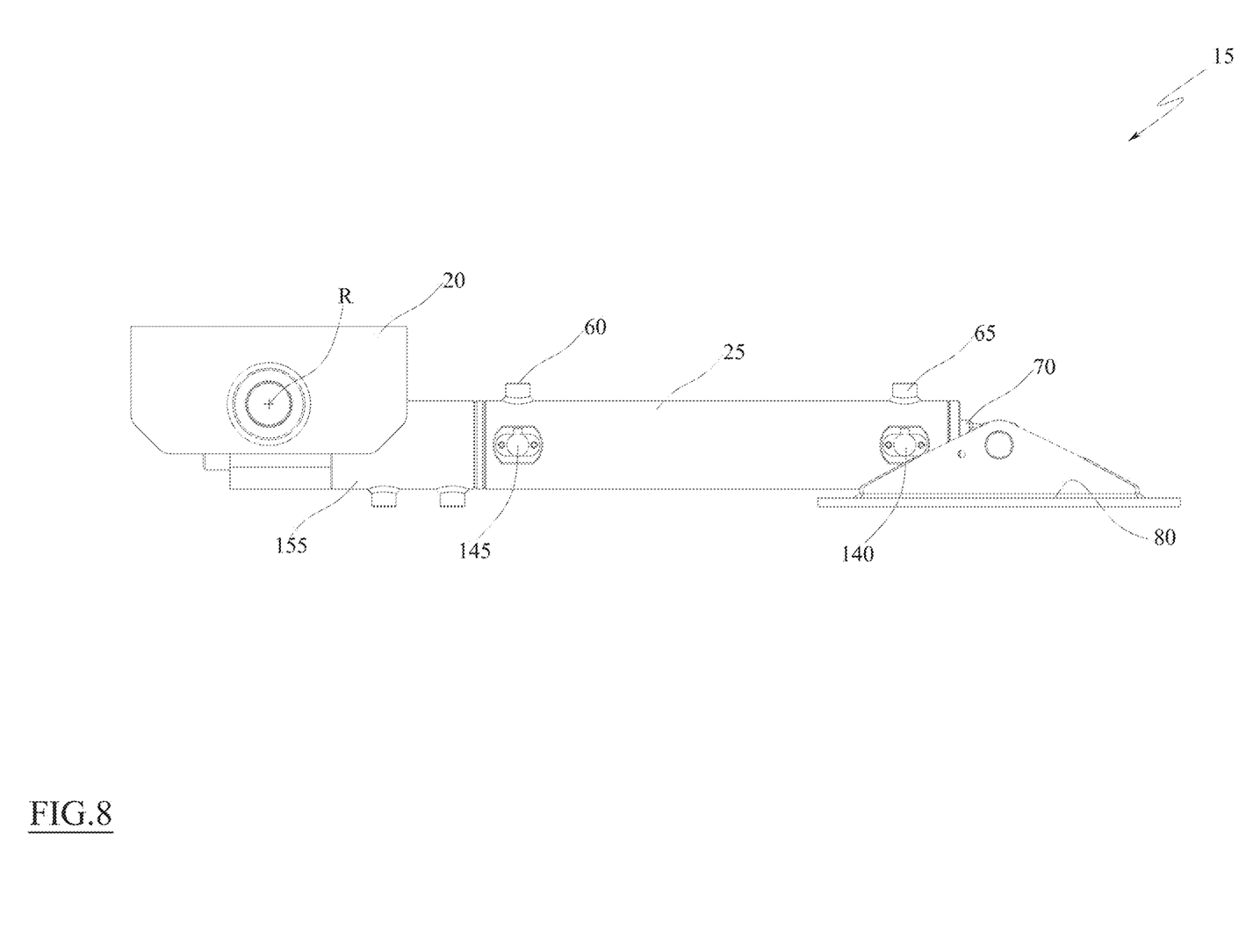
FIG. 8 is a side view of the support foot of the previous figures in a rest position.

The orientation system 150 comprises a cylinder 155, which at a first end 160 is rotatably associated with the flange 20 with respect to the rotation axis R and, at an opposite second end 165, is fixed, for example without degrees of freedom, to the cylinder 25.

The orientation system 150 comprises a pin 170 fixed to the flange 20, for example without degrees of freedom, coaxial to the rotation axis R and a cylindrical housing 175 formed in the cylinder 25, close to the first end 160, and in which the pin 170 is rotatably inserted.

The cylinder 155 comprises a cavity 180 axially shaped coaxial to the longitudinal axis Z of the cylinder 25.

The cavity 180 of the cylinder 155 is closed close to the second end 165 of the cylinder itself and has an opening close to the opposite first end 30. The second end 165 is proximal to the cylinder 25 of the support foot 15 and the first end 160 is distal from the cylinder 25 of the support foot 15.

The orientation system 150 comprises a piston 185 slidably inserted in a sealed manner in the cylinder 155 and that divides the cavity 180 of the cylinder 155 into a first volume 190 and a second volume 195.

The orientation system 150 comprises a first access mouth 200 to the first volume 190, and a second access mouth 205 to the second volume 195, both of said mouths 200,205 being formed in the cylinder 155.

Moreover, the orientation system 150 comprises a stem 210, which is fixedly connected to the piston 185, for example without degrees of freedom with respect to said piston 185, and slides with it along the longitudinal axis of the cavity 180, to which it is coaxial.

The stem 210 has an end fixedly connected to the piston 185 and an end that projects from the cavity 180 of the cylinder 155.

In the opening of the cavity 180 there is a bushing 215 adapted for guiding the stem 70 and for hermetically closing the opening, together with the stem itself.

The orientation system 150 foresees a toothed wheel 220 fixedly connected to the flange 20, for example without degrees of freedom, and coaxial to the rotation axis R.

The toothed wheel is connected to the pin 170, for example it is formed on it.

The orientation system 150 also comprises a rack 225 fixedly connected to the stem 210, for example formed in the stem 210, which engages with the toothed wheel 220.

Figure 10:
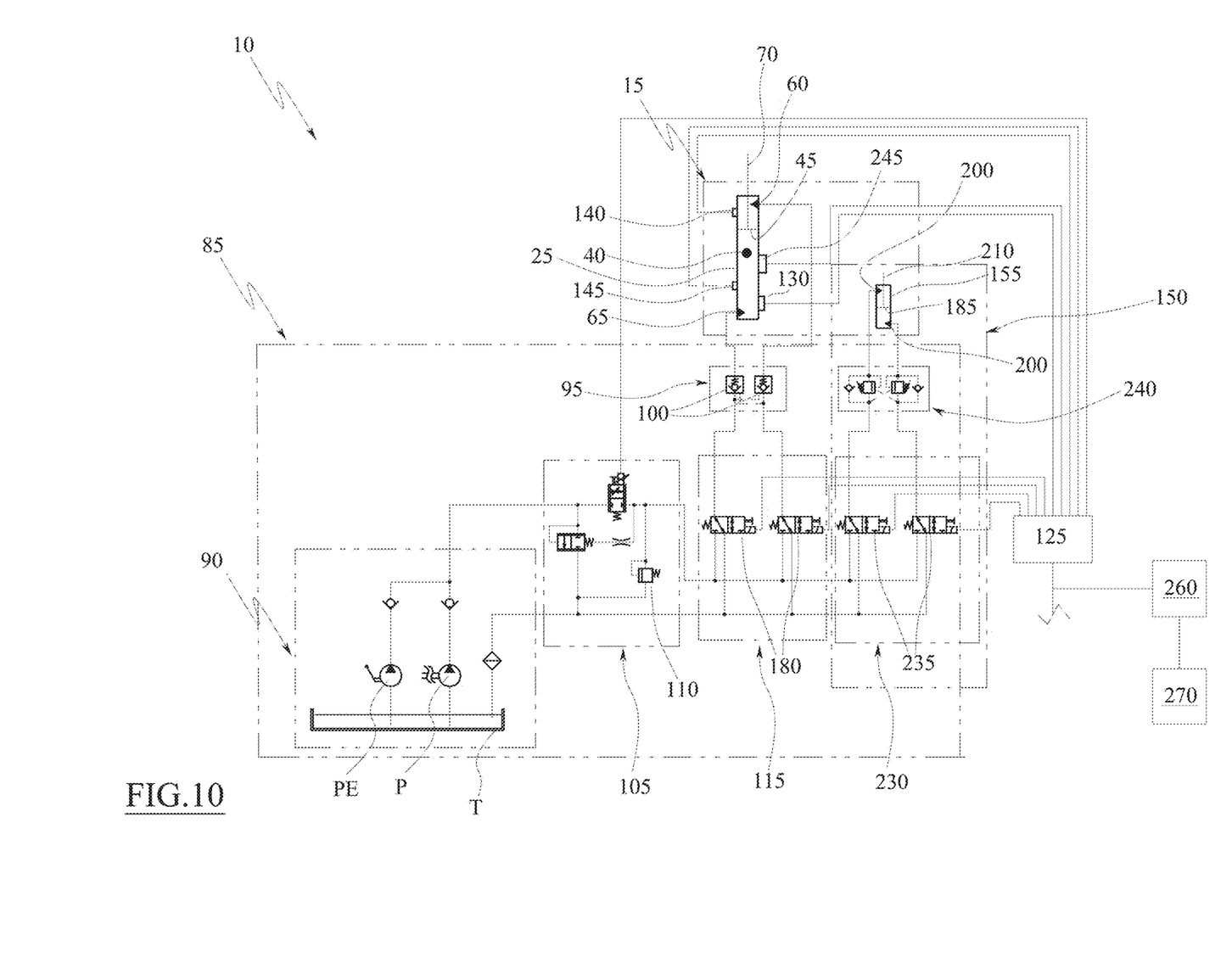
FIG. 10 is a circuit diagram of the support apparatus as illustrated in FIGS. 1 to 8.

Furthermore, the orientation system 150 comprises a selector block 230, which is configured to selectively send pressurised work fluid in the first volume 190 or in the second volume 195.

This is so as to push or pull the rack 225 with respect to the toothed wheel 220, thus causing the rotation of the rack 225 about the toothed wheel 220, i.e. about the rotation axis R.

Said selector block 230 is hydraulically connected to the feeding group 90 of the actuation group 85 and comprises a pair of selecting valves 235, each connected to only one among the first volume 190 and the second volume 195 and configured to selectively put the respective volume 190,195 in communication with the pump P, i.e. with the flow rate regulating block 105, or with the tank T.

The orientation system 150 also comprises a balancing block 240, arranged between the cylinder 155 of the orientation system 150 and the selector block 230, which is configured to regulate the sliding speed of the piston 185 along the cylinder 155 during actuation.

The balancing block 240 comprises a pair of controlled pressure limiting valves.

In both of the embodiments illustrated above, the support apparatus 10 comprises an electronic control unit 125 configured to control the activation of the actuation group 85 of the support foot 15,15' as a function of an activation signal.

The activation signal is, for example, a signal indicative of the retracted or extended position that the support foot 15,15' must take up, i.e. of the position towards which the base 80 must be moved.

In addition or alternatively, the activation signal comprises a desired value of the distance of the base 80 from the reference element of the cylinder 25.

The activation signal can be generated and sent to the electronic control unit 125 through an activation device, for example an electronic control unit of the drawing vehicle 2 of the vehicle 1.

According to a variant of the finding, the activation device can comprise a wireless transceiver apparatus configured to receive the activation signal and electrically connected to the electronic control unit 125.

The electronic control unit 125 is electrically connected to the position sensor and is configured to transmit the value of the indicative parameter monitored by the position sensor 130 to a remote device, i.e. to transmit the value of the distance of the base 80 from the reference element of the cylinder 25 corresponding to the value of the indicative parameter monitored by the position sensor 130 to the remote device.

For example, such a remote device can comprise a display device, configured to display the value of the distance between the base 80 and the reference element of the cylinder 25.

The invention foresees that the electronic control unit 125 is electrically connected to the position sensor 130 and that it is configured to control the activation of the actuation group 85 based on the activation signal and the value of the parameter indicative of the position of the base 80 with respect to the reference element fixedly connected to the cylinder 25 monitored by the position sensor 130.

For example, the electronic control unit 125 is configured to activate the actuation group 85 so as to send pressurised work fluid to the first chamber 50 or to the second chamber 55, respectively based on whether the desired value of the distance of the base 80 from the reference element of the cylinder 25 is greater or smaller with respect to the value of the distance corresponding to the value of the indicative signal monitored by the position sensor 130.

In particular, the electronic control unit 125 is configured to interrupt the activation of the actuation group 85 when the value of the indicative parameter monitored by the position sensor 130 equals the desired value of the distance between the base 80 and the reference element of the cylinder 25.

In the illustrated embodiment, the electronic control unit 125 is electrically connected to the feeding block 90 and to the selecting block 115.

In particular, the electronic control unit 125 is configured to activate the feeding block 90 to send the pressurised work fluid to the selecting block 115, and to actuate the selecting block 115, so as to send the pressurised work fluid to the first chamber 50 or to the second chamber 55 respectively as a function of the activation signal and of the value of the parameter indicative of the position of the base 80 with respect to the reference element of the cylinder 25.

When the indicative value monitored by the position sensor 130 equals the desired value of such a distance, the electronic control unit 125 controls the feeding block 90 and/or the selecting block 115 so that it interrupts the flow of pressurised work fluid to the support foot 15,15'.

Consequently, lacking pressurised work fluid arriving from the feeding block 90, the stabilizing block 95 prevents flow from coming out from the support foot 15,15' locking the base 80 at the distance from the reference element of the cylinder 25 reached.

The electronic control unit 125 can be configured to send an alarm signal to an emitter device when it detects predetermined danger conditions, for example when it detects that the signal indicative of the distance between the base 80 and the reference element of the cylinder 25 does not reach the desired value defined by the activation signal in a predetermined time period.

The electronic control unit 125 is electrically connected to the system for measuring the weight bearing down on the support foot 15,15' and is configured to transmit the monitored value to the remote device.

For example, the first transducer 140 and the second transducer 145 are electrically connected to the electronic control unit 125, which is configured to calculate the value of the weight bearing down on the support foot 15,15' based on the values indicative of the pressure detected by the first transducer 140 and by the second transducer 145, for example based on the difference between said detected pressure values, and to send such a calculated value to the remote device.

The remote device can for example display the value of the weight monitored on the display device.

In particular, the electronic control unit 125 is configured to calculate the value of the weight bearing down on the support foot 15,15' when the actuation group 85 is not actuated to send fluid to the support foot 15,15'.

The electronic control unit 125 is also configured to send an alarm signal to the emitter device when the calculated value of the weight bearing down on the support foot 15,15' reaches a predetermined threshold value.

The electronic control unit 125 is configured to send a warning signal to the remote device when the parameter indicative of the angle of inclination of the support foot 15,15' monitored by the tilt sensor 245 is different from a preset inclination value.

In other words, the electronic control unit 125 is configured to send a warning signal to the remote device when at least one among the value of the indicative parameter of inclination of the axis Z with respect to a vertical axis and the value of the indicative parameter of inclination of the axis Z with respect to a horizontal axis is different from a preset value.

Such a preset inclination value is a range of inclination values, for example a range comprised between −5° and +5°.

The electronic control unit 125 can be configured to send a warning signal when the parameter indicative of the angle of inclination of the support foot 15,15' measured by the tilt sensor 245 is greater with respect to a predetermined value and the support foot 15,15' is not in the retracted position.

The electronic control unit 125 is, moreover, configured to:

set the value of the angle of inclination monitored by the tilt sensor 245, i.e. of the angles with respect to the horizontal axis and to the vertical axis monitored by the inclination system 245, to zero, when it detects, through the system for measuring the weight 135, a value of the weight bearing down on the support foot 15,15' greater than a predetermined value, for a time period greater than a preselected duration, and send a warning signal to the remote device when the parameter indicative of the angle of inclination monitored by the tilt sensor 245, i.e. the parameters indicative of the angles of inclination with respect to the vertical axis and to the horizontal axis monitored by the tilt sensor 245, of the support foot 15,15' is different from zero, i.e. it is different from the value of the angle of inclination set to zero.

For example, the sending of the warning signal takes place if the angle of inclination monitored by the tilt sensor differs from zero by at least +/−1°.

In this way, it is possible to detect whether, once the trailer is positioned with the support foot 15,15' supporting the trailer itself, it tends to sink.

Furthermore, the electronic control unit 125 can be configured, as well as to send the warning signal to the remote device, to control mechanical groups of the trailer on which the support apparatus 10 is installed, so as to counteract the change in angle with respect to the value of the angle of inclination set to zero.

Moreover, the electronic control unit 125 is configured to transmit the value of the indicative parameter of the inclination of the support foot 15,15' measured by the tilt sensor 245 to the remote device.

The electronic control unit 125 is connected to a remote electronic control unit 270, for example forming part of the vehicle 1, preferably housed on the drawing vehicle.

For example, the electronic control unit 125 has an interface that uses a can-bus logic 260 through which it is connected to the remote electronic unit 270, i.e. to the electronic unit of the drawing vehicle.

The electronic control unit 125 is also configured to send and receive signals from a wireless transceiver device, for the communication of the state of the support apparatus 10 and for receiving control signals.

The remote device can for example be the remote electronic control unit 270 or the transceiver device.

The wireless transceiver device can for example form part of the remote electronic unit or can be directly connected to the electronic control unit 125.

The term state of the support apparatus is meant to indicate the values detected by at least one among the position sensor 130, the tilt sensor 245 and the system for measuring the weight 135.

The term "control signals" is meant to indicate at least one among the activation signal and the actuation signal.

In the second embodiment, the electronic control unit 125 is also configured to actuate the orientation system 150.

In particular, the electronic control unit 125 is configured to activate the feeding block 90 and the selector block 230 so as to selectively send pressurised work fluid to the first volume 190 or to the second volume 195, to set the support foot 15 in rotation between the work position and the rest position, i.e. to push the rack 225 against the toothed wheel 220 and make said rack 225 rotate about the toothed wheel 220 with respect to the rotation axis R.

Furthermore, the electronic control unit 125 is configured to activate the orientation system 150 as a function of an actuation signal and the value of the indicative parameter of the inclination of the support foot 15 monitored by the tilt sensor 245. The actuation signal foresees information indicative of a desired inclination of the support foot 15.

For example, the electronic control unit 125 is configured to activate the orientation system 150 so as to send pressurised work fluid to the first volume 190 or to the second volume 195, respectively based on whether the desired value of the inclination of the support foot 15 is greater or smaller with respect to the value of the inclination corresponding to the value of the indicative parameter monitored by the tilt sensor 245.

In particular, the electronic control unit 125 is configured to interrupt the activation of the orientation system 150 when the value of the inclination corresponding to the value of the indicative parameter monitored by the tilt sensor 245 equals the desired value of the inclination.

The operation of the invention is as follows.

Such operation applies to the first embodiment and also to the second embodiment, with the exception of the part that concerns the orientation system 150.

When an operator must support an object through the support foot 15, he/she sends an actuation signal, through the remote electronic control unit, to the control unit 125 so that it activates the orientation system 150 to take the support foot 15 from the first operative position to the second operative position.

Once the support foot 15 is in the second operative position, again through the remote electronic control unit, the operator sends an activation signal to the electronic control unit 125 to move the base 80 from the retracted position to the extended position and thus rest the object to be supported through the support foot 15 on the ground.

During such operations, the electronic control unit 125 analyses the values monitored by the position sensor, by the tilt sensor and by the system for measuring the pressure to verify the conformity of the detected values to predetermined desired values.

The invention thus conceived can undergo numerous modifications and variants, all encompassed by the inventive concept.

Moreover, all of the details can be replaced by other technically equivalent elements.

In practice, the materials used, as well as the contingent shapes and sizes, can be whatever according to the requirements without for this reason departing from the scope of protection of the following claims.

The invention claimed is:

1. Support apparatus equipped with:
   a hydraulic support foot that comprises:
   a cylinder equipped with a cavity axially shaped that has a longitudinal axis,
   a piston slidably received in a sealed manner in the cavity so as to divide said cavity into a first chamber and a second chamber,
   a stem provided with a first end fixedly connected to the piston and a second end that protrudes from the cylinder,
   a base fixed to the second end of the stem, and
   an actuation group of the hydraulic support foot comprising a pump and at least one valve configured to selectively send a pressurised work fluid to the first chamber or to the second chamber so as to change a relative position of the base with respect to the cylinder,
   said support apparatus comprises:
   a position sensor configured to monitor the value of a parameter indicative of a position of the base with respect to a reference element fixedly connected to the cylinder,
   a tilt sensor configured to monitor the value of a parameter indicative of an angle of inclination of the hydraulic support foot with respect to a vertical axis and a horizontal axis, and
   an electronic control unit, electrically connected to said position sensor, which is configured to transmit the value of the indicative parameter monitored by the position sensor to a remote device and to control activation of the actuation group of the support foot as a function of an activation signal and the value of the indicative parameter,
   wherein the electronic control unit is configured to transmit the value of the parameter indicative of the angle of inclination to the remote device and to send an alarm signal to the remote device when the value of the parameter indicative of the angle of inclination is different from a preset value.

2. The support apparatus according to claim 1, wherein the electronic control unit is configured to interrupt the activation of the actuation group when the value of the indicative parameter equals a predetermined value.

3. The support apparatus according to claim 1, wherein the electronic control unit is adapted for being connected to a remote electronic control unit.

4. The support apparatus according to claim 3, wherein the electronic control unit comprises an interface that uses a can-bus logic for the connection to the remote electronic control unit.

5. The support apparatus according to claim 1, wherein the hydraulic support foot comprises a connection flange configured to secure the hydraulic support foot to an object, and wherein the cylinder is rotatably associated with said connection flange according to a rotation axis.

6. The support apparatus according to claim 5, comprising an orientation system of the support foot, which is configured to rotate the cylinder with respect to the connection flange about the rotation axis.

7. Support apparatus equipped with:
   a hydraulic support foot that comprises:
   a cylinder equipped with a cavity axially shaped that has a longitudinal axis,
   a piston slidably received in a sealed manner in the cavity so as to divide said cavity into a first chamber and a second chamber,
   a stem provided with a first end fixedly connected to the piston and a second end that protrudes from the cylinder,
   a base fixed to the second end of the stem, and
   an actuation group of the hydraulic support foot comprising a pump and at least one valve configured to selectively send a pressurised work fluid to the first chamber or to the second chamber so as to change a relative position of the base with respect to the cylinder,
   said support apparatus comprises:
   a position sensor configured to monitor the value of a parameter indicative of a position of the base with respect to a reference element fixedly connected to the cylinder, and
   an electronic control unit, electrically connected to said position sensor, which is configured to transmit the value of the indicative parameter monitored by the position sensor to a remote device and to control activation of the actuation group of the hydraulic support foot as a function of an activation signal and the value of the indicative parameter,
   wherein the hydraulic support foot comprises a connection flange configured to secure the hydraulic support foot to an object, and wherein the cylinder is rotatably associated with said connection flange according to a rotation axis, and
   wherein the support apparatus comprises an orientation system of the hydraulic support foot, which is configured to rotate the cylinder with respect to the connection flange about the rotation axis and comprises:
   a second cylinder, which at one end is fixed to the cylinder of the hydraulic support foot and at another end is hinged to the connection flange with respect to the rotation axis R,
   a piston slidably received in a sealed manner in a cavity axially shaped of the second cylinder of the orientation system so as to divide said axial cavity in a first volume and a second volume, a stem equipped with an end fixedly connected to said piston and an end that protrudes from the cavity of the cylinder, a toothed wheel fixed without degrees of freedom to the connection flange and coaxial to the rotation axis R, a rack fixed to the stem and that engages with the toothed wheel, and a selector block configured to selectively send a pressurised work fluid to the first volume or to the second volume so as to make the rack rotate with respect to the toothed wheel.

8. The support apparatus according to claim 7, wherein the electronic control unit is configured to control activation of the selector block of the orientation system as a function of a selector block activation signal and of the value of the parameter indicative of an angle of inclination of the support foot with respect to a vertical axis and a horizontal axis.

9. Support apparatus equipped with:

a hydraulic support foot that comprises:

a cylinder equipped with a cavity axially shaped that has a longitudinal axis, a piston slidably received in a sealed manner in the cavity so as to divide said cavity into a first chamber and a second chamber, a stem provided with a first end fixedly connected to the piston and a second end that protrudes from the cylinder, a base fixed to the second end of the stem, and an actuation group of the hydraulic support foot comprising a pump and at least one valve configured to selectively send a pressurised work fluid to the first chamber or to the second chamber so as to change a relative position of the base with respect to the cylinder, said support apparatus comprises:

a position sensor configured to monitor the value of a parameter indicative of a position of the base with respect to a reference element fixedly connected to the cylinder, and an electronic control unit, electrically connected to said position sensor, which is configured to transmit the value of the indicative parameter monitored by the position sensor to a remote device and to control activation of the actuation group of the hydraulic support foot as a function of an activation signal and the value of the indicative parameter, wherein the support apparatus comprises a system for measuring a weight bearing down on the hydraulic support foot configured to monitor the value of a parameter indicative of the weight bearing down on the hydraulic support foot and electrically connected to the electronic control unit, which is configured to transmit the parameter indicative of the weight bearing down on the support foot to the remote device.

10. The support apparatus according to claim 9, wherein the system for measuring the weight comprises a first pressure transducer housed in the first chamber and a second pressure transducer housed in the second chamber.

11. Support apparatus equipped with:

a hydraulic support foot that comprises:

a cylinder equipped with a cavity axially shaped that has a longitudinal axis, a piston slidably received in a sealed manner in the cavity so as to divide said cavity into a first chamber and a second chamber, a stem provided with a first end fixedly connected to the piston and a second end that protrudes from the cylinder, a base fixed to the second end of the stem, and an actuation group of the support foot comprising a pump and at least one valve configured to selectively send a pressurised work fluid to the first chamber or to the second chamber so as to change a relative position of the base with respect to the cylinder, said support apparatus comprises:

a position sensor configured to monitor the value of a parameter indicative of a position of the base with respect to a reference element fixedly connected to the cylinder, a tilt sensor configured to monitor the value of a parameter indicative of an angle of inclination of the support foot with respect to a vertical axis and a horizontal axis, and an electronic control unit, electrically connected to said position sensor, which is configured to transmit the value of the indicative parameter monitored by the position sensor to a remote device and to control activation of the actuation group of the support foot as a function of an activation signal and the value of the indicative parameter, wherein the electronic control unit is configured to transmit the value of the parameter indicative of the angle of inclination to the remote device and to control activation of a selector block of the orientation system as a function of a selector block activation signal and of the value of the parameter indicative of the angle of inclination.

* * * * *